(12) United States Patent
Kikuchi et al.

(10) Patent No.: US 6,850,713 B2
(45) Date of Patent: Feb. 1, 2005

(54) OPTICAL SINGLE SIDEBAND TRANSMITTER

(75) Inventors: Nobuhiko Kikuchi, Tokyo (JP); Ryoji Takeyari, Koganei (JP); Toshiki Sugawara, Koganei (JP)

(73) Assignee: Hitachi, Ltd., Tokyo (JP)

( * ) Notice: Subject to any disclaimer, the term of this patent is extended or adjusted under 35 U.S.C. 154(b) by 103 days.

(21) Appl. No.: 10/320,527

(22) Filed: Dec. 17, 2002

(65) Prior Publication Data

US 2003/0189745 A1 Oct. 9, 2003

(30) Foreign Application Priority Data

Apr. 5, 2002 (JP) ........................................ 2002-103344

(51) Int. Cl.[7] .............................. H01S 3/10; G02F 1/00; G02B 26/00; H04B 10/12
(52) U.S. Cl. ........................ 398/201; 359/237; 359/239; 372/25
(58) Field of Search .............. 372/25–26; 359/180–184, 359/237–239; 398/82, 91, 185, 201

(56) References Cited

U.S. PATENT DOCUMENTS

| | | | | |
|---|---|---|---|---|
| 6,072,615 A | * | 6/2000 | Mamyshev | ................. 398/185 |
| 6,114,981 A | * | 9/2000 | Nagata | ........................ 341/143 |
| 6,262,828 B1 | * | 7/2001 | Akiyama et al. | ........... 359/237 |
| 6,278,539 B1 | * | 8/2001 | Ooi et al. | .................... 359/237 |
| 6,407,845 B2 | * | 6/2002 | Nakamoto | ................... 359/239 |
| 6,643,046 B2 | * | 11/2003 | Ibe et al. | ..................... 359/238 |
| 6,718,142 B1 | * | 4/2004 | Murai | ......................... 398/183 |
| 2002/0114047 A1 | * | 8/2002 | McBrien et al. | ............ 359/180 |
| 2004/0008395 A1 | * | 1/2004 | McBrien et al. | ............ 359/238 |

* cited by examiner

*Primary Examiner*—Minsun Oh Harvey
*Assistant Examiner*—Phillip Nguyen
(74) *Attorney, Agent, or Firm*—Antonelli, Terry, Stout & Kraus, LLP

(57) ABSTRACT

With the normal modulation method, it is difficult to construct a Hilbert transform device because it is complicated. To solve the problem, a single sideband modulated optical pulse train is generated by driving a Mach-Zehnder optical modulator for optical pulse generation with a laser source's sine wave clock signals that have been rendered 90 degrees out of phase from each other. The generated pulse train is applied to an optical modulator, modulated with an NRZ (nonreturn-to-zero) data signal, and filtered by a narrow-band optical filter to obtain one of two sidebands.

18 Claims, 15 Drawing Sheets

OPTICAL SPECTRUM AT POINT A IN FIG.1

OPTICAL SPECTRUM AT POINT B IN FIG.1

TRANSMITTANCE OF NARROW-BAND OPTICAL FILTER 104

OPTICAL SPECTRUM AT POINT C IN FIG.1

FIG.3A OPTICAL SPECTRUM AT POINT A AND WAVEFORM
(20-GHz SINE WAVE) IN FIG.1 OF THE PRESENT INVENTION
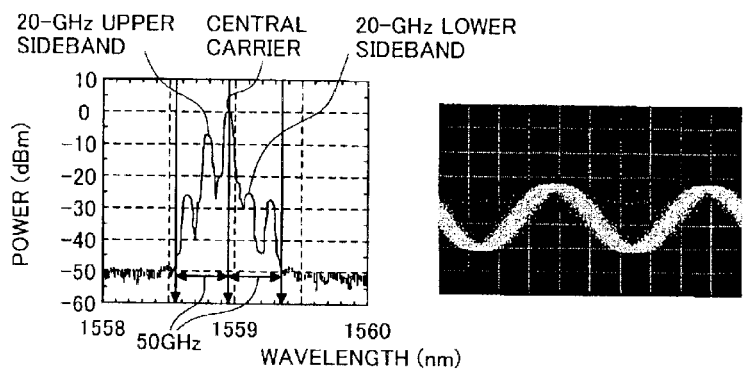
FIG.3B OPTICAL SPECTRUM AT POINT B AND WAVEFORM
(20-GHz RZ MODULATION)
IN FIG.1 OF THE PRESENT INVENTION
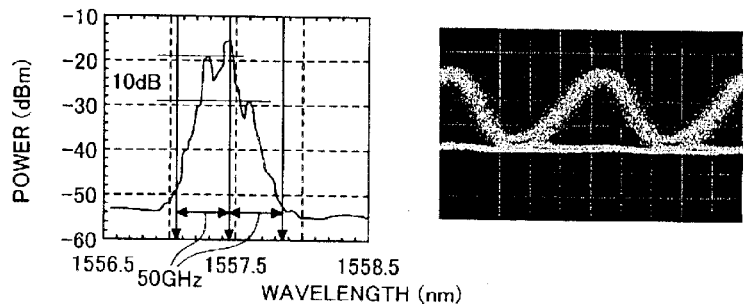
FIG.3C OPTICAL SPECTRUM OF NORMAL RZ MODULATON
AND WAVEFORM (20-GHz RZ MODULATION)
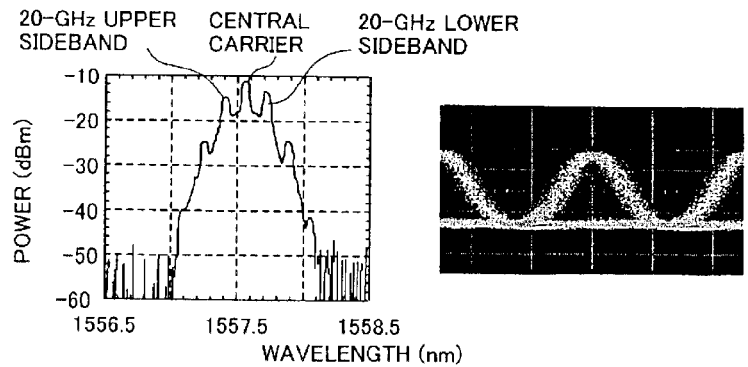

OPTICAL SPECTRUM AT POINT A IN FIG.6

OPTICAL SPECTRUM AT POINT B IN FIG.6 (EQUIVALENT TO THAT IN FIG.4)

TRANSMITTANCE OF OPTICAL FILTER 121

OPTICAL SPECTRUM AT POINT C AND WAVEFORM IN FIG.6

OPTICAL OUTPUT WAVEFORM OF
OPTICAL PATH 133-1 IN FIG.10

OPTICAL OUTPUT WAVEFORM OF
OPTICAL PATH 133-2 IN FIG.10

OPTICAL WAVEFORM AT
POINTS B AND C IN FIG.10

OPTICAL SPECTRUM AT POINT B IN FIG.18

GRAVITY CENTER OF OPTICAL SIGNAL

TRANSMITTANCE OF NARROW-BAND OPTICAL FILTER 104

OPTICAL SPECTRUM AT POINT C IN FIG.18

OPTICAL SINGLE SIDEBAND TRANSMITTER

BACKGROUND OF THE INVENTION

The present invention relates to an optical single sideband transmitter; and, more particularly, the invention relates to an optical single sideband modulation (SSB) method, which is used for bandwidth reduction of an RZ (return-to-zero) modulated optical signal as provided in optical information communication based on use of an optical fiber, and to the structure of an optical transmitter based on that method.

The wavelength-division multiplexing (WDM) method, which provides optical information transmission by multiplexing a plurality of optical signals having to different wavelengths within an optical fiber, is an extremely effective means for increasing the capacity of optical fiber communication.

In recent years, WDM (wavelength-division multiplexing) optical transmission equipment, having more than 100 wavelengths and a total transmission rate of higher than 1 Tbps, has been commercialized. Further, a transmission system having a tenfold number of wavelengths and a transmission rate that is 0.10 times higher is being experimentally studied for implementation. An extremely wide frequency (wavelength) bandwidth is required for such large-capacity information transmission. Its upper limit is determined by the optical fiber's low-loss wavelength bandwidth and the amplification wavelength bandwidth of an optical amplifier, such as an erbium-doped fiber amplifier (EDFA) or other rare-earth doped fiber amplifier for optical signal relay/amplification in the middle of a transmission path, semiconductor optical amplifier, or optical fiber Raman amplifier. The widely used C-band EDFA wavelength bandwidth is 30 nm, which is between 1530 nm and 1560 nm and is equivalent to a frequency width of about 3.8 THz. Although the use of an L-band optical amplifier or Raman amplifier can increase the wavelength bandwidth several times, it lowers the pumping efficiency, which results, for instance, in a cost increase and a deterioration in the optical amplifier performance.

Another method of making effective use of the above-mentioned limited wavelength bandwidth to increase the transmission rate is to reduce the optical signal's signal bandwidth and arrange optical signals (channels) more densely, so as to increase the optical signal frequency (wavelength) density. One example of this method is the optical single sideband modulation method used by the present invention. Although this method is widely used for radio communication, it has not been commercialized for optical fiber communication, and basic investigations concerning this method are currently conducted, for example, mainly by scientific societies. Typical techniques proposed for this method are optical single sideband (SSB) modulation and optical vestigial sideband (VSB) modulation. The SSB technique performs signal processing within an electrical region to directly generate an optical single sideband signal. The VSB technique subjects a double sideband optical signal to optical filtering to extract one of two sidebands and remove the other for the purpose of reducing the signal bandwidth to one-half.

Meanwhile, two optical signal digital intensity modulation methods are normally used: NRZ (nonreturn-to-zero) and RZ (return-to-zero). NRZ modulation has the advantage that it facilitates the optical modulator configuration. RZ modulation, on the other hand, is advantageous in that it is highly immune to optical fiber nonlinear effects and polarization mode dispersion, and it os characterized by the fact that it is unlikely to suffer from waveform degradation even when it is subjected to narrow-band optical filtering. In recent years, therefore, RZ modulation has been highlighted in the field of large-capacity wavelength-division multiplexing. However, RZ modulation generally requires a greater signal bandwidth than NRZ modulation, and it cannot increase the frequency density with ease. In that sense, RZ modulation is disadvantageous in terms of spectral efficiency.

The present invention deals with a technology that extracts one of two RZ signal sidebands so as to reduce the optical signal bandwidth to half. In the examples given below, the applications of two conventional single sideband modulation methods to the RZ modulation method are described to point out the problems encountered with the conventional methods.

Studies are conducted so as to apply the conventional SSB modulation method mainly to the NRZ modulation method. FIG. 4 shows an example in which the conventional SSB method is applied to an RZ modulated optical transmitter. In this example, NRZ data signals (Q and Q'), which are opposite in phase with each other, are first supplied to RZ signal generator circuits 112-1, 112-2, respectively, and converted to RZ electrical signals that are opposite in phase with each other. The RZ signal generator circuits can be implemented by, for example, gating a clock signal with a data signal. Within an SSB signal generator circuit 113, a 90-degree phase shifter 110 shifts the phase of inverted signal Q' (−180 degrees) by 90 degrees to generate a data signal having a phase angle of −90 degrees. An addition circuit 111-1 subjects the resulting data signal and the noninverted signal Q (0 degrees) to vector addition to generate a drive signal 106-1 having a phase angle of 45 degrees. Meanwhile, an addition circuit 111-2 subjects the above-mentioned signal having a phase angle of −90 degrees and the inverted signal Q' to vector addition to generate a drive signal 106-2 having a phase angle of −135 degrees. The two drive signals 106-1, 106-2 are 90 degrees out of phase from each other within the entire frequency range. When they are applied to the electrodes of a dual-arm drive Mach-Zehnder optical modulator, the laser light (wavelength: A), which is output from a laser source 100, can be intensity-modulated to generate an RZ single sideband signal. Note that a phase shifter 102 compensates for the path length difference between the two drive signals 106-1, 106-2, which may be caused by a manufacturing error or the like. FIG. 5 shows a typical optical spectrum of a single sideband signal obtained in the above-mentioned manner. The original signal wavelength is λ. Thanks to data signal modulation, the optical signal spectrum of a normal RZ signal expands by a width of Rb in both directions. In the example shown in the figure, however, the sideband intensity on the long wavelength side is suppressed by more than 10 dB due to the SSB modulation effects. Theoretically, 100% intensity suppression is achievable.

However, since this method entails high-frequency signal processing, significant waveform deterioration occurs. As a result, the symmetry between the two drive signals 106-1, 106-2 is destroyed so that perfect sideband suppression is difficult to achieve. In most cases, the degree of single sideband suppression is about 10 dB, as shown in FIG. 5. In a practical WDM transmission, however, 20 dB or a higher degree of suppression is required to prevent signal quality deterioration, which can be caused by the interference from neighboring channels. This is the reason why this method cannot be readily implemented. Further, this method is at a disadvantage in that it requires a complicated modulation circuit, which raises the cost of the transmitter. Particularly, the RZ signal has about two times the electrical signal bandwidth of the NRZ signal and, therefore, entails higher-frequency signal processing, making expensive high-frequency component parts necessary.

Mathematically, the 90-degree phase shifter 110 is a circuit that performs a Hilbert transform. At present, however, it is extremely difficult to fabricate a circuit that performs a Hilbert transform over the entire frequency range. Experimentally, a 90-degree hybrid or other microwave component may be used as a substitute for approximation. In this instance, however, the signal's low-frequency component is lost. Consequently, digital signals used for normal optical fiber communication cannot be subjected to SSB conversion, which is a major problem for practical use.

FIG. 6 shows a typical RZ modulation single sideband optical transmitter to which the conventional VSB method is applied. The light output from a laser source 100 enters an optical pulse generation optical modulator 120. This optical modulator is driven by a sine wave clock signal (frequency: Rb). As a result, an intensity-modulated optical pulse train, having a repetition period of Rb, is output to point A, as seen in the figure.

FIGS. 7A through 7D show the optical signal spectra at the points shown in FIG. 6. FIG. 7A shows an optical spectrum at point A. The optical pulse train spectrum has two sidebands, which are positioned on either side of and are spaced apart by Rb from a central carrier having a wavelength of λ. The optical pulse train is then supplied to an NRZ optical modulator 103, which is driven by an NRZ electrical information signal having a bit rate of Rb, gated, and converted to an RZ optical signal. FIG. 7B shows the RZ optical signal's spectrum, which is broadened by information signal modulation. Subsequently, the optical signal is filtered by a VSB narrow-band optical filter 121, converted to a vestigial sideband signal, and output from optical fiber 105. FIG. 7C shows the transmissive characteristics of the VSB narrow-band optical filter 121. The figure indicates that transmission occurs through the signal's only one sideband (short-wavelength side), and that the bandwidth is about half the signal spectrum, and further that the center wavelength is shifted away from a center frequency of λ and toward the short-wavelength side. Therefore, the long-wavelength side sideband of the output optical signal at point C is suppressed, as shown in FIG. 7D, so that the bandwidth is reduced to about one-half.

The VSB optical transmitter based on the conventional technology, as described above, has many problems, as will be explained below. First of all, when this method is used, an optical filter removes one of two sidebands of a double sideband optical signal and part of the central carrier. Therefore, the optical loss is significant (at least 3 dB). In addition, the received signal amplitude lowers, thereby to degrade the receiving sensitivity due to the loss of the central carrier.

Further, the output optical signal's spectrum shape is determined by the shape of the VSB narrow-band optical filter. Therefore, if there is an error in the optical filter shape or bandwidth, waveform deterioration results, thereby reducing the receiving sensitivity. It is extremely difficult to control these factors on the order of several gigahertz (approximately one-tenth of a signal bit rate). It is also necessary that the difference between the optical signal wavelength and narrow-band filter transmission band center wavelength be set with extremely high accuracy. If both of these wavelengths are in error, receiving sensitivity deterioration, crosstalk between neighboring wavelengths, or other significant performance deterioration results. Particularly, the wavelength stabilization of an optical signal to a position spaced away from the optical filter center is susceptible to disturbances, such as intensity variations in an input optical signal or transmission characteristics changes with time. Therefore, a control error is likely to occur.

SUMMARY OF THE INVENTION

The object of the present invention is to offer a practical, RZ modulation type, optical single sideband transmitter that solves the above-mentioned problems.

Since a Hilbert transform circuit was not easily implemented by the conventional SSB method, the preferred embodiments of the present invention obviate the necessity for such a Hilbert transform circuit and the associated high-frequency signal processing.

While the conventional SSB method cannot implement a Hilbert transform circuit with ease, avoid significant waveform deterioration, or prevent the transmitter from becoming complicated and expensive, the method provided by the present invention avoids such problems by applying a phase difference of 90 degrees only to a sine wave signal having a clock frequency. A phase difference of 90 degrees can be given to a sine wave signal easily and inexpensively through the use of an electrical delay line or phase shifter. The present invention also makes it possible to replace some parts of the light source and modulator with a semiconductor-based integrated light source, commercially available NRZ transmitter, and the like, thereby simplifying the configuration and reducing the cost.

Further, the symmetry between the two drive signals can be easily maintained without allowing it to be destroyed, because the present invention merely has to maintain the symmetry of narrow-band sine wave signals. Furthermore, sideband suppression ratio reduction can be prevented by the present invention as it provides SSB modulation for a clock component and uses a narrow-band optical filter for the extraction of a signal's one sideband (VSB method).

As regards the problems with the conventional VSB optical transmitter, the present invention can prevent the narrow-band optical filter from suffering a significant loss, the received signal amplitude from decreasing, and the receiving sensitivity from degradation by subjecting only the signal of a clock component to single sideband modulation, for the purpose of reducing the amount of the component to be removed by the narrow-band optical filter.

The present invention also solves the waveform deterioration and receiving sensitivity degradation problems that are attributable to the optical filter shape and bandwidth error. The reason why this is possible is that the degree of waveform deterioration is minimized when a limited amount of carrier component is removed by the narrow-band optical filter, because the RZ signal waveform is mainly determined by a clock component.

As regards high-accuracy (about one-tenth of a signal bit rate; several gigahertz) wavelength stabilization for the difference between the optical signal wavelength and narrow-band filter transmission band center wavelength, the present invention does not encounter any problem even when the accuracy of wavelength stabilization more or less lowers because the carrier component, which most seriously affects the sideband suppression ratio and waveform, is suppressed beforehand. As to the necessity for complicated control for stabilizing the optical filter at a position that is offset from the signal center, the present invention can also exercise maximum value control to maximize the optical signal's filtered intensity because the optical signal is allowed to pass the optical filter with the carrier component suppressed beforehand to shift the center of gravity.

BRIEF DESCRIPTION OF THE DRAWINGS

FIG. 3A is a diagram which shows the optical spectrum at point A in FIG. 1 and its optical waveform (20 GHz sine wave), which were derived from an RZ-SSB modulation experiment that was conducted according to the present invention;

FIG. 3B is a diagram which shows the optical spectrum at point B in FIG. 1 and its optical waveform (20 GHz RZ modulation), which were derived from an RZ-SSB modulation experiment that was conducted according to the present invention;

FIG. 3C is a diagram which shows a normal RZ modulated optical spectrum and its optical waveform (20 GHz RZ modulation);

DETAILED DESCRIPTION OF THE PREFERRED EMBODIMENTS

Figure 1:
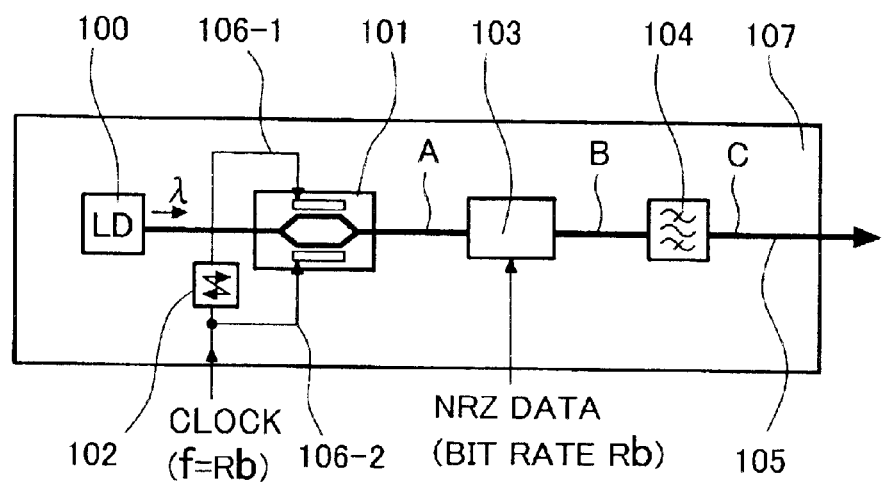
FIG. 1 is a schematic diagram which shows a first preferred embodiment of the present invention.

FIG. 1 is a schematic diagram that shows a first preferred embodiment of the present invention. It illustrates the structure of an optical single sideband transmitter in accordance with the present invention. When the structure of the first preferred embodiment is used, the light output (wavelength: $\lambda$) from a laser source 100 is applied to a dual-arm drive Mach-Zehnder optical modulator 101, and the light output thereof is supplied to an NRZ optical modulator 103. A sine wave clock signal (frequency: Rb and equal to the bit rate) within an electrical region is branched into two drive signals 106-1, 106-2 and applied to the two electrodes of the dual-arm drive Mach-Zehnder optical modulator 101. A DC bias component is applied to these two drive signals so as to produce an intensity modulation with their resulting amplitudes equalized. Further, these drive signals are rendered 90 degrees out of phase from each other by a phase shifter 102 (delay line). As a result, the laser light is converted to an intensity-modulated, single sideband (SSB) periodic optical pulse train. This principle is the same as that for single sideband modulation, which is used for normal electrical/optical signal modulation. However, the present embodiment uses a sine wave for the modulation signal. Therefore, the two drive signals 106-1, 106-2 can easily be rendered 90 degrees out of phase from each other so as to generate a single sideband signal when either of the two signals is delayed with the phase shifter.

Figure 2A:
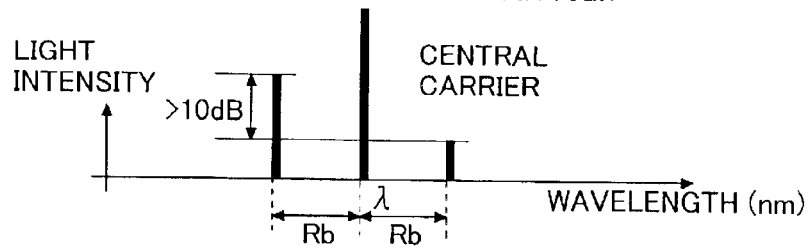
FIG. 2A is a diagram which shows the optical spectrum at point A in FIG. 1.

FIG. 2A shows the optical signal spectrum at point A (the output point of the dual-arm drive Mach-Zehnder optical modulator 101) in FIG. 1. Thanks to the above single sideband modulation effects, one of carrier components (the one on the long-wavelength side in the present embodiment) generated at frequencies that deviate upward and downward by the modulation frequency Rb from the optical signal central carrier (component of wavelength $\lambda$) can be suppressed, for example, by more than 10 dB.

Figure 2B:
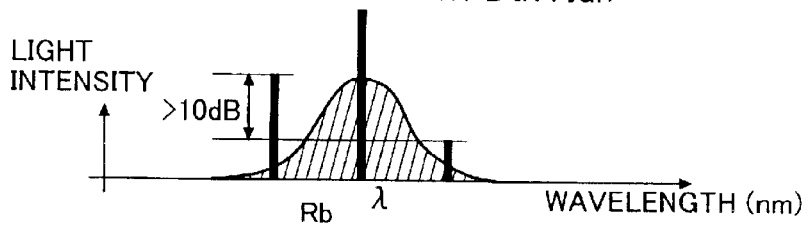
FIG. 2B is a diagram which shows the optical spectrum at point B in FIG. 1.

An NRZ data signal, which is synchronized with the optical pulse period, is applied to the NRZ optical modulator 103, and an RZ optical signal is generated by turning ON/OFF the optical pulse train in accordance with the data signal. Since no SSB modulation is effected in this process, the optical signal's optical spectrum at the output point (point B) of the NRZ optical modulator 103 shows that double modulated sidebands are generated by the data signal, as indicated by slanted lines in FIG. 2B.

Figure 2C:
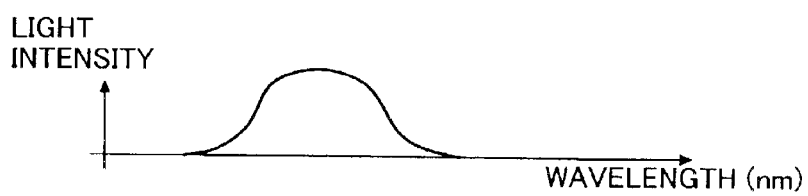
FIG. 2C is a diagram which shows the transmittance of narrow-band optical filter 104.
Figure 2D:
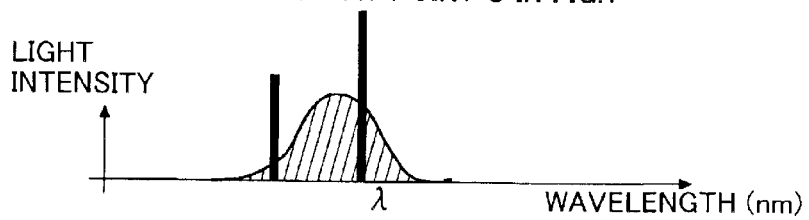
FIG. 2D is a diagram which shows the optical spectrum at point C in FIG. 1.
Figure 4:
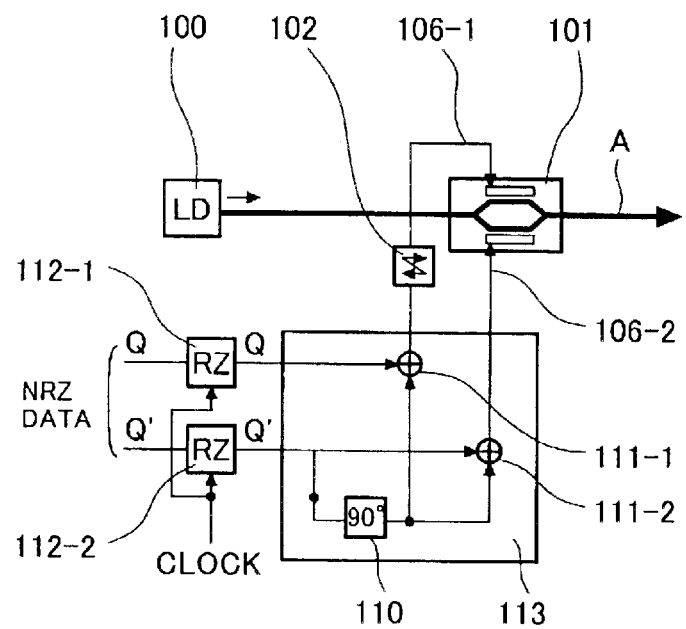
FIG. 4 is a schematic diagram which shows an example in which SSB modulation is applied to conventional RZ modulation.
Figure 5:
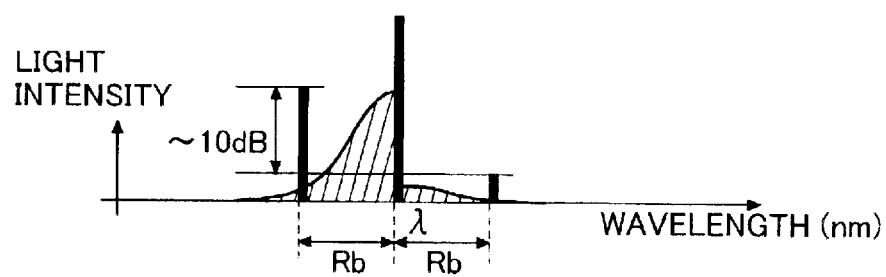
FIG. 5 is a diagram which shows the spectrum of an optical signal that is indicated in FIG. 4.
Figure 6:
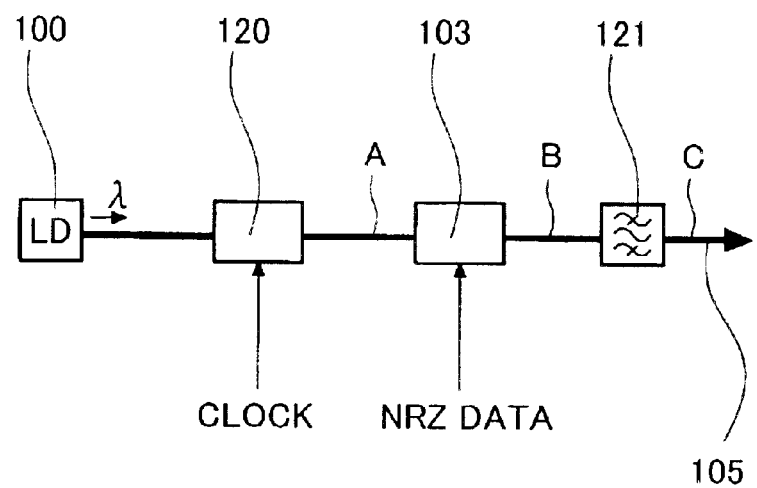
FIG. 6 is a schematic diagram which shows a typical RZ modulated single sideband optical transmitter to which the conventional VSB method is applied.
Figure 7A:
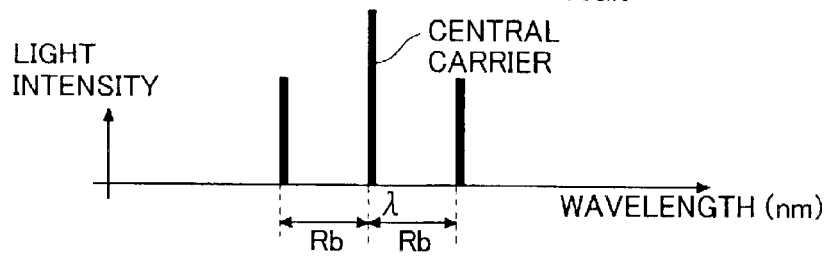
FIG. 7A is a diagram which shows the optical spectrum at point A in FIG. 6.
Figure 7B:
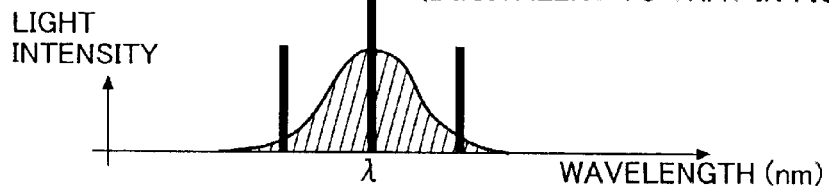
FIG. 7B is a diagram which shows the optical spectrum at point B in FIG. 6.
Figure 7C:
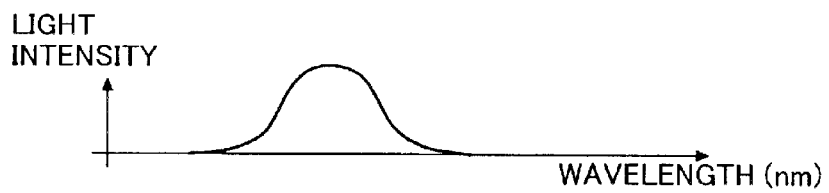
FIG. 7C is a diagram which shows the transmittance of optical filter 121.
Figure 7D:
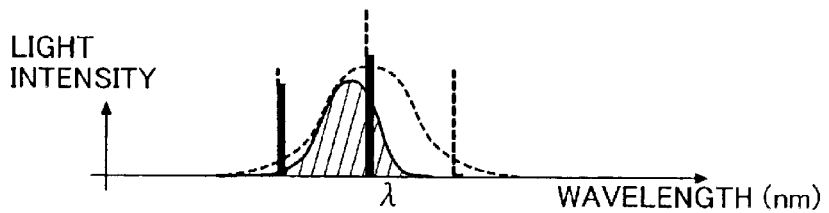
FIG. 7D is a diagram which shows the optical spectrum at point C in FIG. 6.

The resulting optical signal then passes a narrow-band optical filter 104. The transmission characteristics of the optical filter 104 are shown in FIG. 2C. As indicated in that figure, the optical filter 104 is a bandpass filter, which has a transmission width narrower than the optical signal's spectrum width, and its transmission center wavelength is shifted until it overlaps with the sideband on the short-wavelength side. When the optical signal passes through this optical filter, the optical spectrum on the long-wavelength side is suppressed, as shown in FIG. 2D, and the data modulation section and carrier section are both converted to a single sideband (or vestigial sideband) modulated signal. As a result, the optical signal bandwidth is compressed.

FIGS. 3A through 3C show the optical spectra and waveforms that were actually obtained during a 20 Gbps RZ optical modulation experiment. In the present embodiment, the dual-arm drive Mach-Zehnder optical modulator 103 is driven by 20 GHz sine wave electrical signals that are 90 degrees out of phase from each other. As is obvious from FIG. 3A, the sideband on the long-wavelength side (underside) is suppressed by about 20 dB at the output point (point A) so that a single sideband results. As indicated by the figure at right, the time-domain is waveform represents 20 GHz periodic optical pulses. At output point B of the NRZ optical modulator 103, the optical signal waveform is converted to an RZ optical signal, as indicated by the right-hand section of FIG. 3B. At this point, too, it is obvious that an approximately 10 dB suppression effect is exercised on the carrier component, as indicated by the left-hand section of FIG. 3B. FIG. 3C indicates a case where normal RZ optical modulation is effected and 20 GHz sine wave electrical signals, which are in phase with each other, are applied as the two drive signals for the dual-arm drive Mach-Zehnder optical modulator 103. In this case, it can be confirmed that the optical spectrum (left) is perfectly symmetrical, although the waveform (right) is virtually the same as the one in FIG. 3B. As indicated in FIG. 3B, the present invention makes it possible to turn the RZ optical signal's carrier component into an SSB electrically in advance and to turn the data modulation section into a VSB with an optical filter, while increasing the degree of carrier component sideband suppression.

As described above, the present invention requires only the sine wave modulation section to retain a phase difference of 90 degrees between signals. Therefore, it eliminates the necessity for using an expensive, difficult-to-implement, 90-degree hybrid circuit, which is needed for the conventional SSB method. When compared to an independent use of the optical VSB method, the present invention is advantageous in that it not only increases the sideband suppression ratio for the carrier section, but also minimizes the loss in the narrow-band optical filter 113 and the changes in the optical signal waveform, because the carrier section is turned into an SSB beforehand.

In accordance with the present invention, the two sine wave drive signals 106-1, 106-2 need to be 90 degrees out of phase from each other. This setup can be performed with a phase shifter, delay line, or delay circuit, as described with reference to the present embodiment. This purpose may be achieved by inserting a predetermined amount of delay beforehand, manually adjusting the amount of delay as needed, or detecting the phase difference between the two signals and automatically adjusting it.

As the Mach-Zehnder optical modulator 101, which is the first optical modulator for the present invention, a dual-arm drive Mach-Zehnder optical modulator may be used no matter whether it is made of lithium niobate, polymer, semiconductor, or another material. Since the present invention subjects only the clock component to SSB modulation, it does not require the use of a high-precision optical modulator such as is necessary for the conventional SSB method and which is highly symmetrical over the entire bandwidth range. The present invention permits the use of a semiconductor Mach-Zehnder or other optical modulator that is relatively inferior in modulation characteristics. As the second optical modulator, an optical modulator of any type can be used so long as it achieves NRZ intensity modulation.

Although the sideband on the long-wavelength side is suppressed in the description of the present embodiment, the present invention can produce the same effects even when the sideband on the short-wavelength side is suppressed. This can be accomplished by shifting the phases of the two drive signals 106-1, 106-2, which are to be applied to the dual-arm drive Mach-Zehnder optical modulator 101, by 90 degrees in an opposite direction, and shifting the narrow-band optical filter center wavelength toward the long-wavelength side.

Further, sideband suppression can be alternately effected on either the long-wavelength side or short-wavelength side by dynamically adjusting the phase relationship between the two drive signals 106-1, 106-2 and the center wavelength of the optical filter or the wavelength of the laser source 100. This selective sideband suppression can be achieved easily by using a variable phase shifter instead of the phase shifter 102 and a wavelength tunable optical filter instead of the narrow-band optical filter 104, or by using a wavelength tunable laser source instead of the laser source 100.

As the narrow-band optical filter 104, any narrow-band bandpass filter can be basically used, including a dielectric multilayered filter and an optical fiber grating filter. Especially in a wavelength-division multiplexing embodiment of the type to be described later, optical signals having different wavelengths can be simultaneously filtered by the use of a Fabry-Perot optical resonator, Mach-Zehnder optical interferometer, optical ring resonator, or other narrow-band optical filter having periodic transmission characteristics.

Although the present embodiment schematically indicates that various optical parts are coupled together with optical fiber, such coupling can also be achieved in a different manner. For example, various devices can be coupled together by using a parallel beam propagating through space or by using a waveguide. Also, note that this coupling scheme is not mandatory when the employed devices are positioned next to each other.

Figure 8:
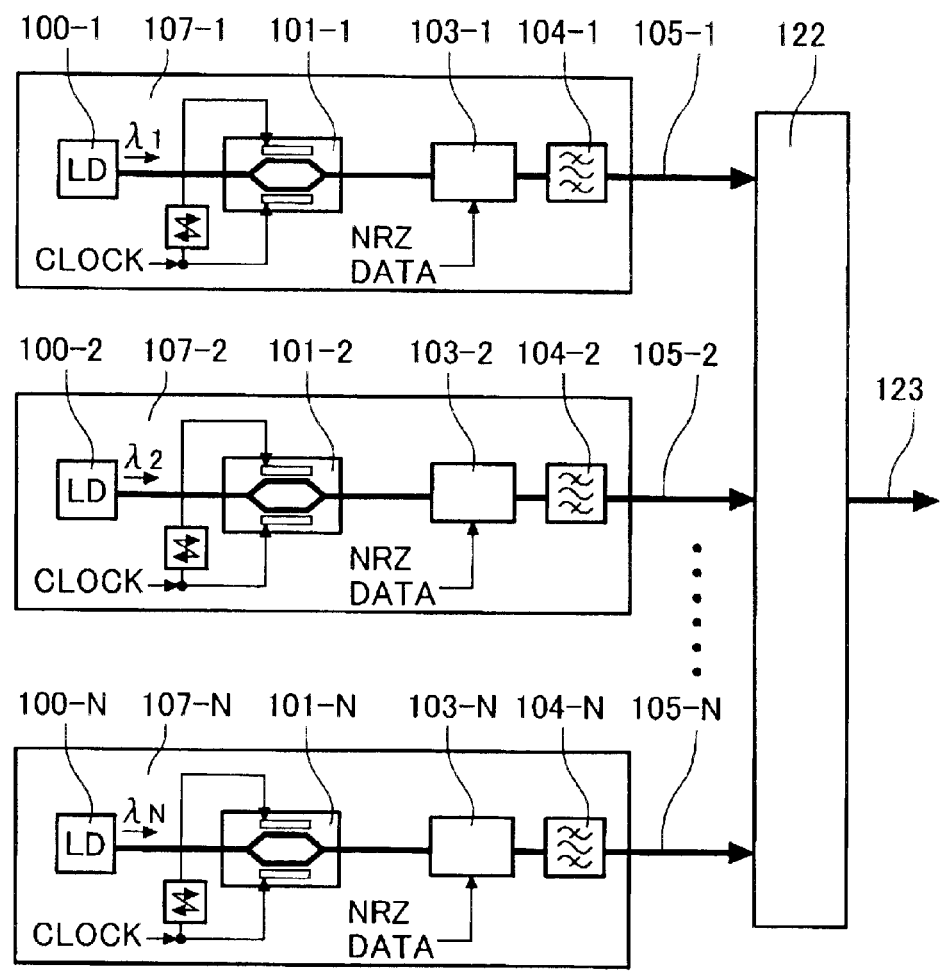
FIG. 8 is a schematic diagram which shows a second preferred embodiment of the present invention.

FIG. 8 shows a second preferred embodiment of the present invention.

Figure 9:
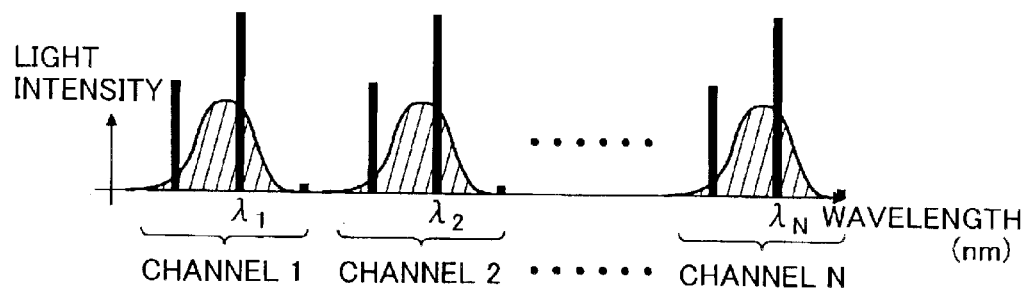
FIG. 9 is a diagram which shows the spectrum of an output optical signal that is indicated in FIG. 8.

The example shown in this figure indicates that the light outputs from the RZ single sideband optical transmitters 107-1, 107-2, . . . 107-N of the present invention, which differ in transmission wavelength (have a wavelength of λ1, λ2, . . . λN, respectively), are multiplexed by an optical multiplexer 122 to implement a wavelength-division multiplexed RZ single sideband optical transmitter. FIG. 9 shows the spectrum of an optical signal that is output to the output optical fiber shown in FIG. 8. The present invention ensures that the RZ optical signal is turned into a single sideband by electrical signal processing and optical filtering to attain an adequate sideband suppression ratio. It, therefore, makes it possible to achieve high-density wavelength-division multiplexing by minimizing the wavelength intervals between wavelength channels.

Figure 10:
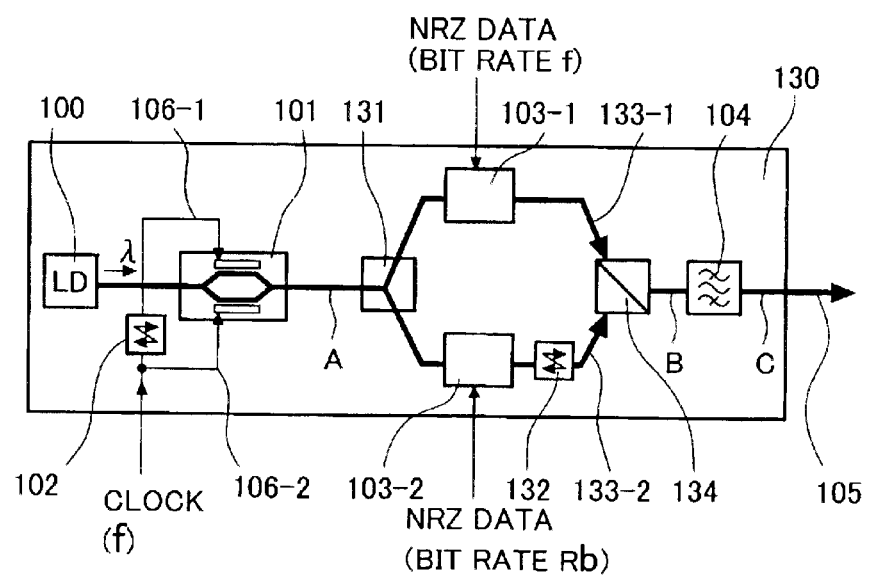
FIG. 10 is a schematic diagram which shows a third preferred embodiment of the present invention.
Figure 11A:
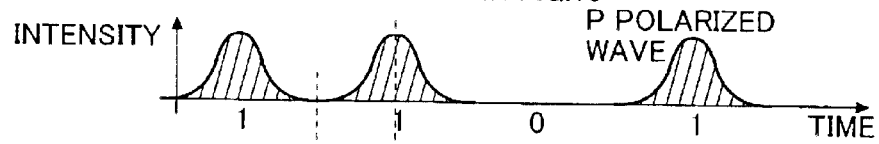
FIG. 11A is a diagram which shows the output optical waveform of optical path 133-1 in FIG. 10.
Figure 11B:
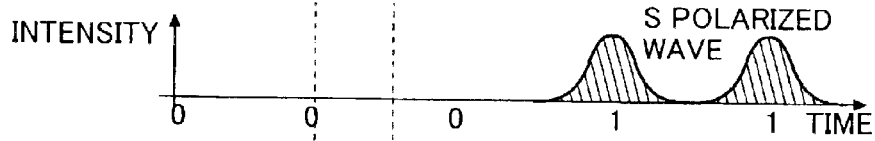
FIG. 11B is a diagram which shows the output optical waveform of optical path 133-2 in FIG. 10.
Figure 11C:
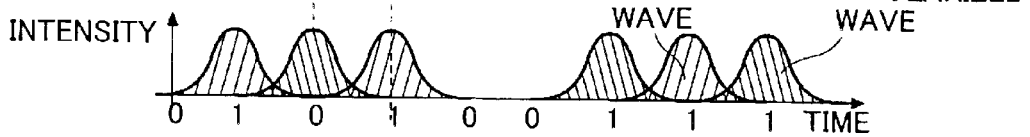
FIG. 11C is a diagram which shows the optical waveforms at points B and C in FIG. 10.

FIG. 10 shows a third preferred embodiment of the present invention. The example shown in this figure indicates that the RZ single sideband modulated signal provided by the first preferred embodiment of the present invention is further subjected to bit-polarization multiplexing to increase the transmission capacity. The SSB optical pulse train (frequency: f) output from a dual-arm drive Mach-Zehnder optical modulator 103 is separated into two by an optical modulator 131, applied respectively to NRZ optical modulators 103-1, 103-2, intensity modulated respectively by independent NRZ data signals (bit rate: f) to produce RZ optical signals, and output to optical paths 133-1, 133-2. An optical phase shifter 132 is positioned in the optical path 133-2 to make adjustments so that the time lag between the RZ signals is equal to ½ bit (1/(2f) in the example). FIGS. 11A and 11B respectively show the waveforms of RZ optical signal outputs from optical paths 133-1 and 133-2. The optical signals are both applied to a polarization beam splitter 134 and multiplexed in such a manner that their polarizations are perpendicular to each other. FIG. 11C shows the waveform at output point B of the polarization beam splitter 134. This signal has a bit-polarization interleaved waveform (bit rate: 2f) whose polarization alternately changes with time, that is, depending on whether an odd- or even-numbered bit is encountered. Further, the resulting waveform is applied to a narrow-band optical filter 104 to extract only one sideband for side suppression ratio increase. As a result, a bit-polarization interleaved signal in SSB form can be obtained. When a multiplexing method based on a polarization region is combined in this manner with the single sideband modulation method of the present invention, it is possible to double the optical frequency utilization efficiency and to allow two signals to share the narrow-band optical filter 104 with a view toward transmitter cost reduction. Another advantage is that the transmitter structure can be simplified, because the narrow-band optical filter 104 and the wavelength stabilization circuit for the light output from the laser source 100 are also shared.

Although the present embodiment deals with bit-polarization multiplexing, it is also applicable to an alternative polarization multiplexing method so long as the multiplexing is based on a polarization region. For example, the present embodiment can also be applied to a normal polarization multiplexing method, which provides multiplexing without shifting the bit phases of cross polarization components. It is also applicable to polarization interleave multiplexing or to another method that provides perpendicular polarization for a set of neighboring channels, although the use of such a method makes it impossible to share the optical filter and wavelength stabilization circuit.

Figure 12:
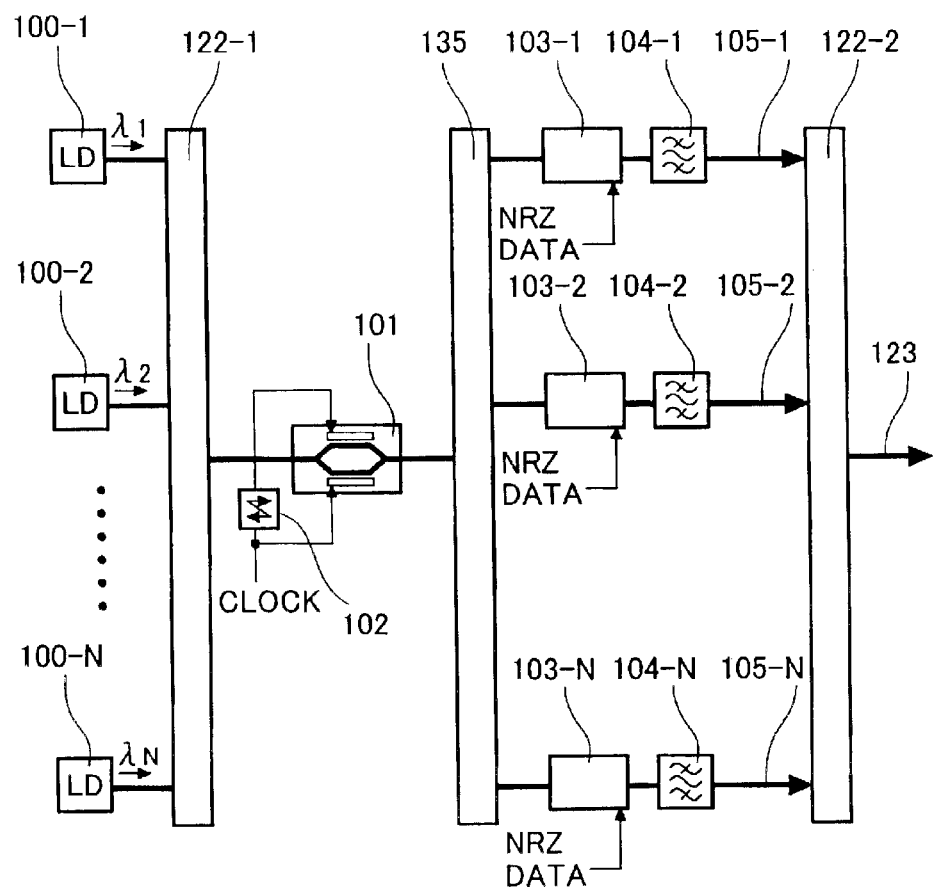
FIG. 12 is a schematic diagram which shows a fourth preferred embodiment of the present invention.

FIG. 12 shows a fourth preferred embodiment of the present invention. This preferred embodiment uses the RZ single sideband optical transmitters 107-1 through 107-N, which have different wavelengths, as provided in the second preferred embodiment shown in FIG. 8. These optical transmitters share a dual-arm drive Mach-Zehnder optical modulator 101, which serves as an element common to them, in order to decrease the number of optical modulators for cost reduction purposes. In the present embodiment, the laser light outputs from laser sources 100-1 through 100-N, which have wavelengths λ1 through λN, are multiplexed by an optical multiplexer 122, output from a single optical fiber line, and converted to an optical pulse train by the common dual-arm drive Mach-Zehnder optical modulator 101. An optical demultiplexer 135 separates the resulting optical pulse train back into wavelength components λ1 through λN. The resulting wavelength components are respectively applied to NRZ optical modulators 103-1 through 103-N, modulated respectively by different data signals, turned into a VSB by narrow-band optical filters 104-1 through 104-N, multiplexed by an optical multiplexer 122-2, and outputted to an output optical fiber 123. The Mach-Zehnder optical modulator generally has a wide optical modulation bandwidth, which ranges from tens to hundreds of nanometers. Therefore, it can simultaneously modulate optical signals that differ in wavelength, as described herein. Note that the optical multiplexers 122-1, 122-2 do not always have to be a wavelength-dependent device so long as they are capable of multiplexing optical signals having different wavelengths and outputting the resulting multiplexed signal to a single optical fiber line. For example, they can be partly or wholly replaced by an optical coupler or optical star coupler.

Figure 13:
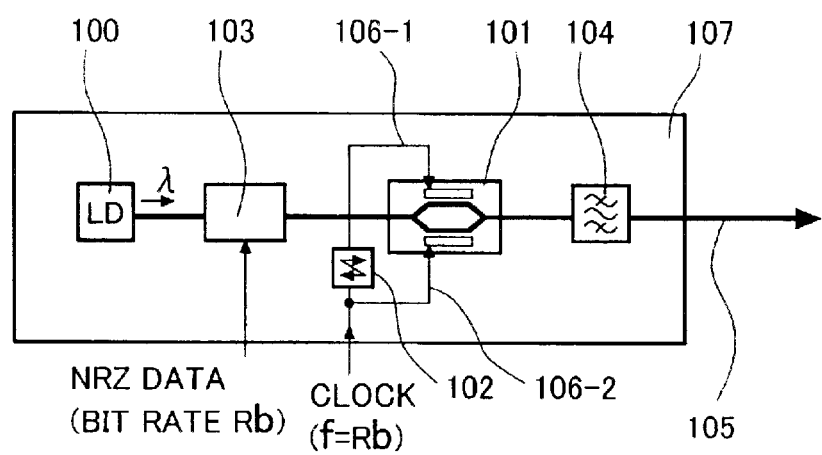
FIG. 13 is a schematic diagram which shows a fifth preferred embodiment of the present invention.

FIG. 13 shows a fifth preferred embodiment of the present invention. In this preferred embodiment, the positions of the NRZ optical modulator 103 and dual-arm drive Mach-Zehnder optical modulator 101, in the first preferred embodiment of the present invention, are reversed front to back. In the present embodiment, the laser light output from a laser source 100 is intensity modulated by an NRZ optical modulator 103 and applied to a dual-arm drive Mach-Zehnder optical modulator 101. The resulting RZ intensity modulated optical signal is then converted to an RZ single sideband optical signal by a narrow-band optical filter 104. The present embodiment uses the same phase relationship between two drive signals 106-1, 106-2 and drive conditions as the first preferred embodiment. When the positional relationship between the two modulators is reversed, as described herein, the laser source 100 and NRZ modulator 103 can be replaced, for instance, by an NRZ optical transmitter, which has been widely used for optical communication and is readily available, or by a semiconductor integrated light source, which is packaged or integrated on a single semiconductor chip to incorporate both the laser source and NRZ modulator.

Alternatively, it is possible to avoid the use of the NRZ modulator 103 and adopt a direct modulation laser that modulates the current of the laser source 100 with an NRZ data signal. In general, direct modulation by a semiconductor laser is not readily, applicable to high-speed wavelength division multiplexed communication because the frequency spread (frequency chirping) is generally great. In the present embodiment, however, an unnecessary frequency chirping component can be removed by the narrow-band optical filter 104 to improve the transmission characteristics. For laser modulation, a frequency modulation method may be used instead of an intensity modulation method. The reason is that the same effect as produced by NRZ modulation can be exercised when the narrow-band optical filter 104 removes only the frequency components related to the marked components of the NRZ signal. In situations where a semiconductor laser is used, frequency modulation is far better than intensity modulation when it comes to frequency chirping reduction. Therefore, the amount of unnecessary frequency chirping component to be removed by the narrow-band filter 104 decreases, thereby making it possible to improve the output light intensity, the degree of sideband suppression, and other transmission characteristics.

Figure 14:
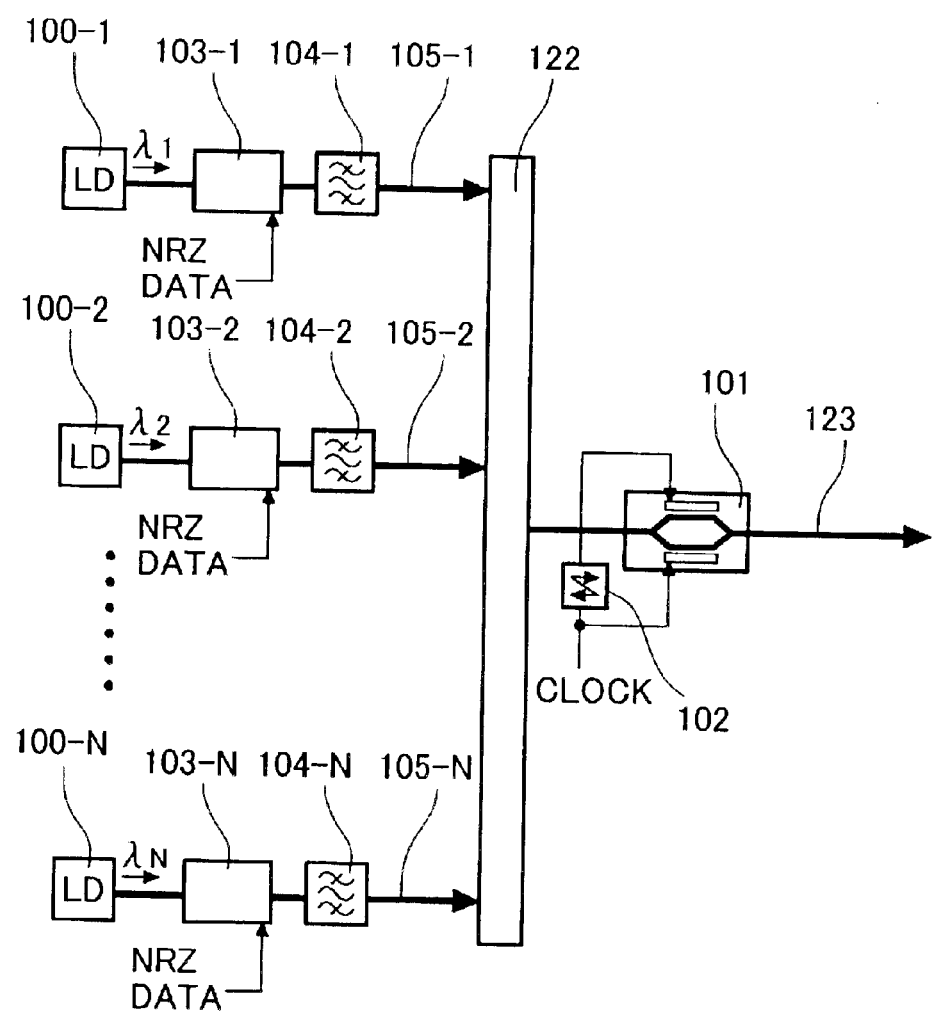
FIG. 14 is a schematic diagram which shows a sixth preferred embodiment of the present invention.

FIG. 14 shows a sixth preferred embodiment of the present invention. In this preferred embodiment, a dual-arm drive Mach-Zehnder optical modulator 101, which is a common device for wavelength-division multiplexing of the optical transmitter in the fifth preferred embodiment, is shared to decrease the number of optical modulators for cost reduction purposes. In the present embodiment, the laser light outputs from laser sources 100-1 through 100-N, which have wavelengths λ1 through λN, are applied respectively to NRZ optical modulators 103-1 through 103-N, modulated respectively by different NRZ data signals, and converted to VSB-NRZ optical signals by narrow-band optical filters 104-1 through 104-N. Subsequently, the optical signals are multiplexed by an optical multiplexer 122, output from a single optical fiber line, and converted to a single sideband RZ signal by the dual-arm drive Mach-Zehnder optical modulator 101, which is operates in common to all wavelengths. When compared to the wavelength-division multiplexing transmitter of the aforementioned fourth preferred embodiment, the counterpart of the present embodiment entails a smaller number of optical multiplexers and demultiplexers, thereby making it possible to reduce the cost as well as the loss and waveform deterioration that may occur at the time of multiplexing/demultiplexing.

In the present embodiment, the multiplexer 122 can be replaced by an optical coupler or other wavelength-independent device. Further, an optical filter having periodic transmission characteristics relative to wavelengths can be additionally used after multiplexing to filter a plurality of optical signals at a time to enhance the sideband suppression characteristics. Furthermore, the wavelength-division multiplexed signal derived from the wavelength-division multiplexing optical transmitter of the present embodiment can be combined with one or more additional wavelength-division multiplexing optical transmitters to perform polarization multiplexing or wavelength interleave multiplexing.

Figure 15:
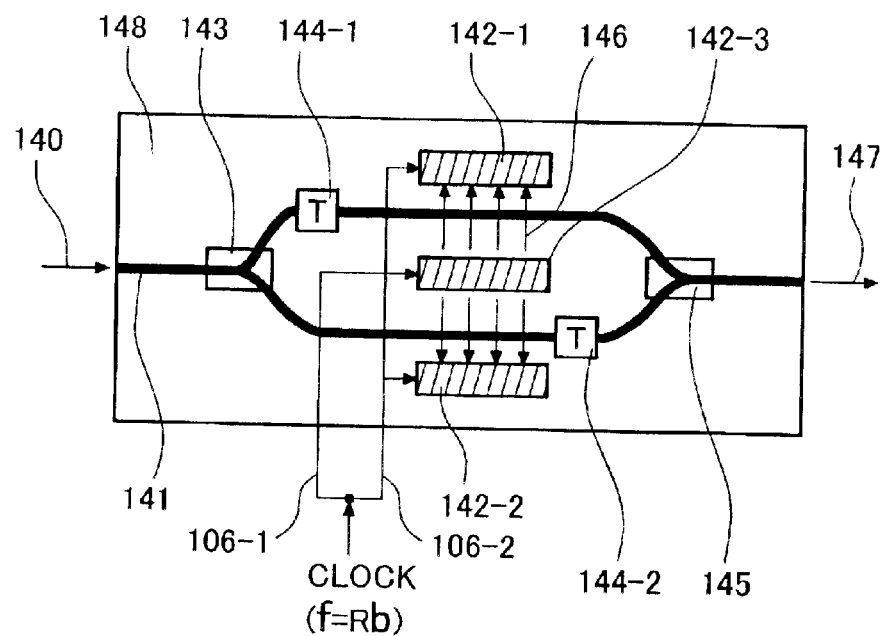
FIG. 15 is a schematic diagram which shows a seventh preferred embodiment of the present invention.

FIG. 15 depicts a seventh preferred embodiment of the present invention. It shows the structure of a single-arm drive Mach-Zehnder optical modulator for SSB optical pulse generation 148, which can be used as a substitute for the dual-arm drive Mach-Zehnder optical modulator 101. The configuration employed by the present embodiment permits the two sine wave drive signals 106-1, 106-2 to be applied in the same phase with a view toward decreasing the number of drive signals and obviating the necessity for the electrical region phase shifter 102. Input light 140 is separated and introduced into two optical waveguides by an optical diverging device 143, phase modulated respectively by exercising an electro-optical effect or the like, multiplexed by an optical coupler 145, and output as output light 147. As the two optical waveguides, delay waveguides 144-1, 144-2 are inserted in the respective lines. Their delay values are equivalent to a sine wave clock signal phase angle of 90 degrees (delay time $T=1/4/Rb$). The phases of an electric field 146, as applied to the two optical waveguides by electrodes 142-1 through 142-3, are rendered 90 degrees apart from each other by the delay waveguides. The resulting effect is the same as that produced when the drive signals are rendered 90 degrees out of phase from each other, as stated in the description of an aforementioned preferred embodiment. In the present embodiment, the electrode structure is specially designed to obviate the necessity for a dual-arm drive. As is the case with a commercially available single-arm drive zero-chirp Mach-Zehnder optical modulator, the present embodiment permits a common electrode 142-3 to simultaneously apply an electric field 146, which is opposingly oriented relative to the two electrically connected electrodes 142-1, 142-2, to the two waveguides, thereby subjecting the two waveguides to opposingly oriented optical phase modulations. Therefore, it is possible to produce the same effect as provided by the dual-arm drive Mach-Zehnder optical modulator 101 without using drive signals that are in opposite phase with each other.

Figure 16:
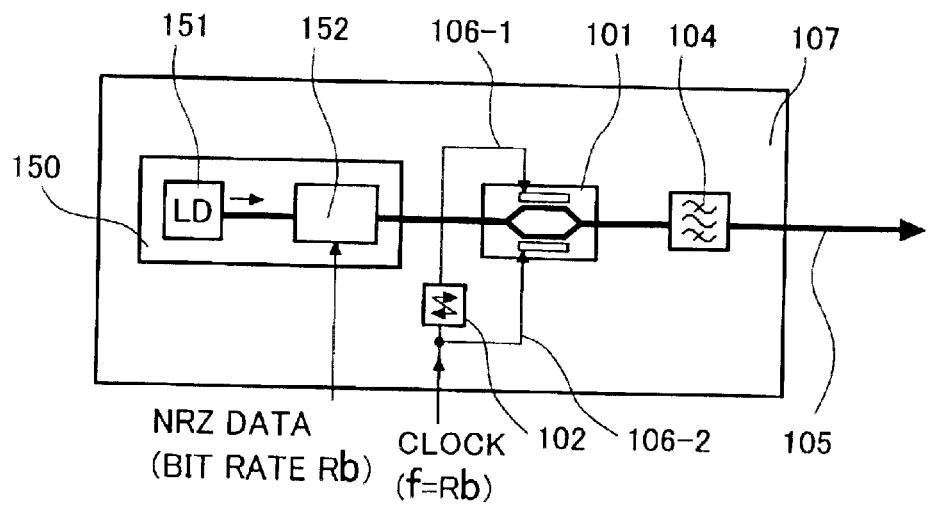
FIG. 16 is a schematic diagram which shows an eighth preferred embodiment of the present invention.

FIG. 16 depicts an eighth preferred embodiment of the present invention. In this preferred embodiment, the laser source 100 and NRZ optical modulator 103 in the fifth preferred embodiment are replaced by a semiconductor optical modulator integrated light source 150. Since the light output from a semiconductor laser source 151 in the semiconductor optical modulator integrated light source 150 is NRZ-modulated by an absorption-type semiconductor optical modulator 152, the effect produced by the fifth preferred embodiment can be completely exercised, while decreasing the number of required parts. As is the case with the present embodiment, the cascaded optical parts for the other embodiments can also be replaced as needed by integrated optical parts that are mounted on a single chip or within a single package. As regards the fifth preferred embodiment, for instance, the NRZ modulator 103 and dual-arm drive Mach-Zehnder optical modulator 101 can be integrated into a single device. In the first preferred embodiment, the combination of the laser source 100 and dual-arm drive Mach-Zehnder optical modulator 101, or the combination of the dual-arm drive Mach-Zehnder optical modulator 101 and NRZ modulator 103, can be replaced by an integrated device.

Figure 17:
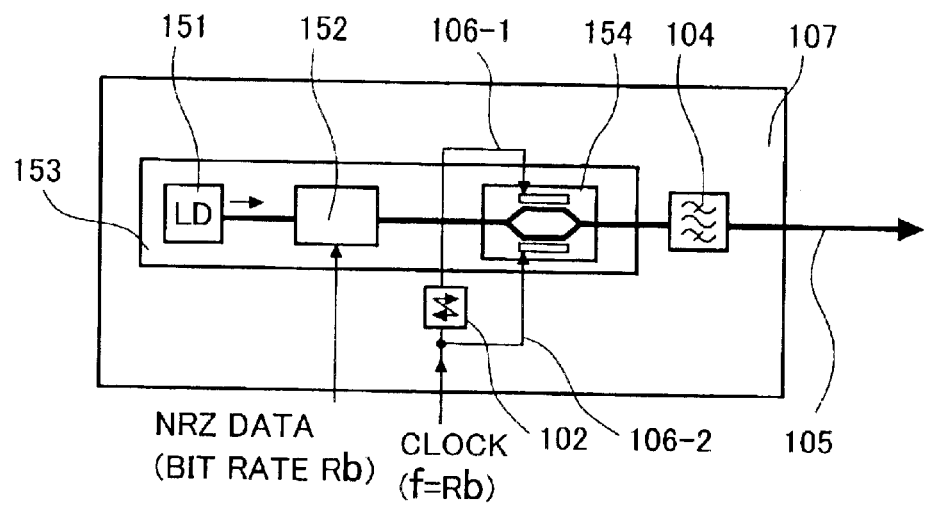
FIG. 17 is a schematic diagram which shows a ninth preferred embodiment of the present invention.

FIG. 17 shows a ninth preferred embodiment of the present invention. In this preferred embodiment, the laser source 100, NRZ optical modulator 103, and dual-arm drive Mach-Zehnder optical modulator 101 in the fifth preferred embodiment are replaced by a semiconductor multi-stage optical modulator integrated light source 153. The semiconductor multi-stage optical modulator integrated light source 153 can be applied to the first preferred embodiment, if the NRZ optical modulator 103 and dual-arm drive Mach-Zehnder optical modulator 101 are connected in reverse order.

Figure 18:
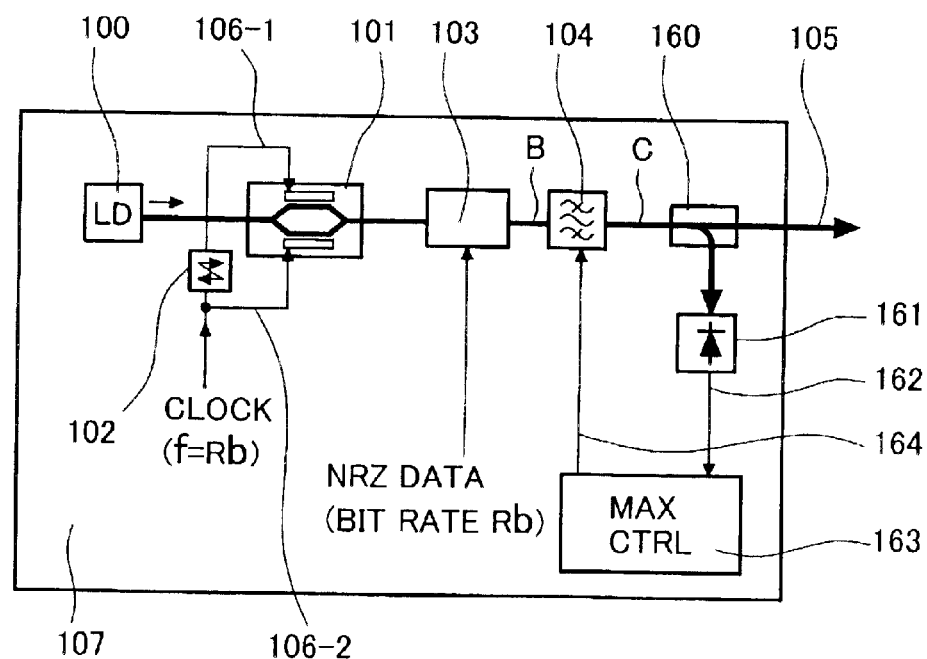
FIG. 18 is a schematic diagram which shows a tenth preferred embodiment of the present invention.
Figure 19A:
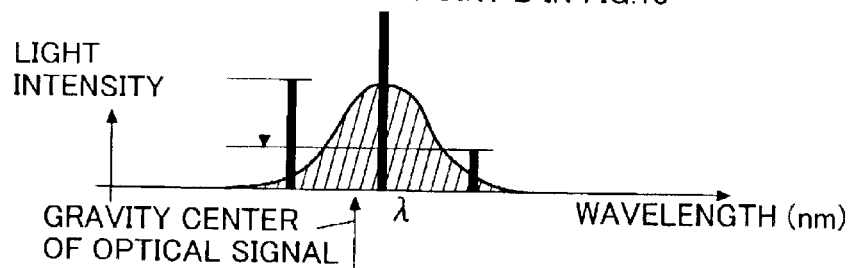
FIG. 19A is a diagram which shows the optical spectrum at point B in FIG. 18.
Figure 19B:
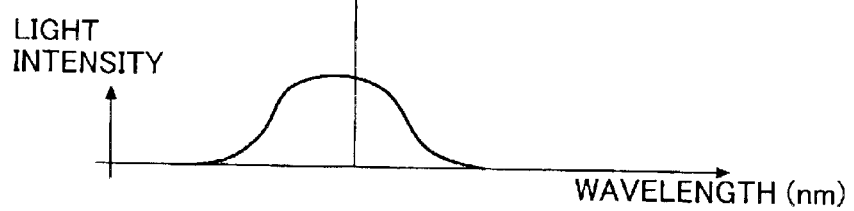
FIG. 19B is a diagram which shows the transmittance of narrow-band optical filter 104.
Figure 19C:
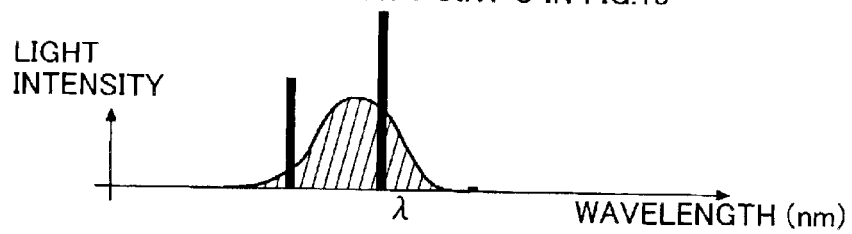
FIG. 19C is a diagram which shows the optical spectrum at point C in FIG. 18.

FIG. 18 shows a tenth preferred embodiment of the present invention. This preferred embodiment applies the wavelength stabilization method of the present invention to the narrow-band optical filter of the first preferred embodiment. In the present embodiment, an optical coupler 160 extracts part of an optical signal that has passed through a narrow-band optical filter 104 and applies it to an optical detector 161 for converting it to a detection signal 162, which is an electrical signal representing the light intensity. A maximum control circuit 163 observes the intensity of a detection signal 162, and exercises feedback control of a control signal 164 in such a direction as to maximize the intensity. FIGS. 19A through 19C depict the relationships between the optical signal spectra and optical filter transmission characteristics that are indicated in FIG. 18. The spectrum of an optical signal at point B in FIG. 18, which immediately precedes the narrow-band optical filter of the present invention, indicates that the carrier component's single sideband (long-wavelength side of the present embodiment) is suppressed, as shown in FIG. 19A. Therefore, the center of gravity of the optical signal spectrum is displaced toward the other sideband (short-wavelength side of the present embodiment). The intensity of the optical signal passing through the narrow-band optical filer 104 is maximized when the wavelength of the narrow-band optical filter 104 approximately agrees with the optical signal's center of gravity (FIG. 19B). As a result, the above-mentioned maximum control permits only the spectrum component of one of two sidebands (short-wavelength side of the present embodiment) to be extracted so as to generate a single sideband optical signal, as shown in FIG. 19C. While maximum control is exercised, the control point remains unchanged even when the optical signal intensity, filter loss, or other factor changes. Therefore, the use of maximum control is advantageous in that it is less likely to result in a control error than with the use of the conventional VSB method in which the optical filter center frequency and the signal's center of gravity are displaced for control purposes. Further, since the present embodiment suppresses the highest-intensity carrier component of the RZ signal's sideband spectrum in advance, there is an advantage in that the sideband suppression ratio does not significantly deteriorate even if the optical filter position changes to some extent.

Although the center wavelength of the narrow-band optical filter 104 is controlled in the present embodiment, the laser source 100 can be alternately subjected to wavelength control. In this instance, the laser source wavelength can be varied by feeding the control signal 164 back to the drive current and temperature of the laser source 100. Further, when a wavelength-tunable laser is used as the laser source 100, the control signal can be fed back, for example, to the resonator length and phase adjustment current of the wavelength-tunable laser. The control scheme described herein can be used in conjunction with the other embodiments of the present invention as well as the present embodiment.

What is claimed is:

1. An optical single sideband transmitter comprising a laser source, a first optical module, a second optical module, and an optical filter, wherein said transmitter acquires RZ (return-to-zero) modulated light that is single-sidebanded by the (1) or (2) indicated below:

(1) The laser light output from said laser source is supplied to said first optical module, via two optical paths, and converted into a single-sideband periodic optical pulse train using two sine wave electrical signals that are phase shifted by 90 degrees from each other; the single-sideband periodic optical pulse train, which is the output from said first optical module, is applied to said second optical module and intensity modulated by a digital information signal; and, the resulting output is then single-sidebanded by said optical filter; and (2) The laser light, which is the output from said laser source, is applied to said second optical module and subjected to NRZ (nonreturn-to-zero) intensity modulation by said digital information signal; a NRZ intensity modulated optical signal, which is the output from said second optical module, is applied to said first optical module, via two optical paths, and converted into a RZ optical signal with single sidebanded optical carriers using the two sine wave electrical signals that are phase shifted by 90 degrees from each other; and, the resulting output is then single-sidebanded by said optical filter.

2. The optical single sideband transmitter according to claim 1, wherein said first optical module is a Mach-Zehnder optical modulator having electrodes coupled to receive the two sine wave electrical signals having the same bit rate but are phase shifted by 90 degrees from each other.

3. The optical single sideband transmitter according to claim 1, wherein an output optical signal is wavelength division multiplexed.

4. The optical single sideband transmitter according to claim 1, wherein said first optical modulator corresponds to one of a lithium niobate (LN) optical modulator, a polymer-based optical modulator, or a semiconductor optical modulator.

5. The optical single sideband transmitter according to claim 1, wherein a modulator integrated light source, which is obtained by integrating a semiconductor laser and an electro-absorption semiconductor optical modulator or a Mach-Zehnder semiconductor optical modulator, is used to perform functions of said laser source and said second optical module; or wherein the function of said second optical module is performed by directly converting a current of said laser source with an NRZ electrical signal.

6. The optical single sideband transmitter according to claim 1, further comprising:

one or more optical couplers, an optical detector, and a maximum control circuit, wherein part of the optical signal output from said optical filter is branched by said optical coupler, converted to an electrical signal by said optical detector, and applied to said maximum control circuit, which controls the frequency of the optical signal output so as to maximize an intensity of said electrical signal.

7. An optical single sideband transmitter, comprising:

plurality of laser sources to generate laser light outputs in different wavelengths;

a first optical modulator, an optical demultiplexer, one or more second optical modulators, and an optical filter to transmit an optical signal whose intensity waveform is subjected to RZ (return-to-zero) modulation by a digital information signal, wherein laser light outputs are multiplexed, applied to the first optical modulator, simultaneously converted to a single sideband modulated periodic optical pulse train, and demultiplexed into individual wavelengths by said optical demultiplexer, then the resulting optical pulse trains, differing in wavelength, are modulated with an information signal by the one or more second optical modulator, and filtered by said optical filter to obtain and output one of two sidebands.

8. The optical single sideband transmitter according to claim 7, further comprising: one or more optical couplers, an optical detector, and a maximum control circuit, wherein part of the optical signal output from said optical filter is branched by said optical coupler, converted to an electrical signal by said optical detector, and applied to said maximum control circuit, which controls the frequency of the optical signal output so as to maximize them intensity of said electrical signal.

9. An optical single sideband transmitter, comprising:

a plurality of laser sources ti generate laser light outputs having different wavelengths;

a first optical modulator, one or more second optical modulators, and one or more optical filters to transmit an optical signal whose intensity waveform is subjected to RZ (return-to-zero) modulation by a digital information signal, wherein laser light outputs are subjected to NRZ (nonreturn-to-zero) modulation with an information signal by respective second optical modulators appropriate for individual wavelengths, and filtered by said optical filter to obtain one of two sidebands, then the resulting optical signals are multiplexed and applied to the first optical modulator, and simultaneously converted to a single sideband modulated optical RZ signal for output purposes.

10. The optical single sideband transmitter according to claim 9, wherein a modulator integrated light source, which is obtained by integrating a semiconductor laser and an electro-absorption semiconductor optical modulator or a Mach-Zehnder semiconductor optical modulator, is used to perform the functions of said laser source and second optical modulator; or wherein the function of said second optical modulator is performed by directly converting a current of said laser source with an NRZ electrical signal.

11. The optical single sideband transmitter according to claim 10, further comprising:
one or more optical couplers, an optical detector, and a maximum control circuit,
wherein part of the optical signal output from said optical filter is branched by said optical coupler, converted to an electrical signal by said optical detector, and applied to the said maximum control circuit, which controls the frequency of the optical signal output so as to maximize an intensity of said electrical signal.

12. A transmitter, comprising:
a laser source to generate a laser light having a predetermined wavelength;
a first optical modulator arranged to modulate the laser light in accordance with two sine wave signals that are phase shifted by 90 degrees from each other, to produce a single sideband periodic optical pulse train;
a second optical modulator arranged to modulate the single sideband periodic optical pulse train in accordance with NRZ data to produce a RZ (return-to-zero) modulated optical signal; and
an optical filter arranged to filter the RZ modulated optical signal to produce a resultant optical signal having an increased side suppression ratio.

13. The transmitter as claimed in claim 12, wherein the first optical modulator corresponds to a dual-arm drive Mach-Zehner optical modulator having electrodes driven by the two sine wave signals that are phase shifted by 90 degrees from each other to produce the single sideband periodic optical pulse train, and the second optical modulator corresponds to a NRZ (nonreturn-to-zero) optical modulator driven by the NRZ data to produce the RZ modulated optical signal.

14. The transmitter as claimed in claim 13, wherein the dual arm drive Mach-Zehner optical modulator is made of one of lithium niobate, polymer, and semiconductor.

15. The transmitter as claimed in claim 12, further comprising an optical multiplexer arranged to multiplex the resultant optical signal having a predetermined wavelength along with other optical signals having different wavelengths.

16. An optical single sideband transmitter, comprising:
a laser source to generate a laser light having a predetermined wavelength;
a dual-arm drive Mach-Zehner optical modulator having electrodes driven by the two sine wave signals that are phase shifted by 90 degrees from each other, arranged to modulate the laser light to produce a single sideband periodic optical pulse train;
an optical separator arranged to separate the single sideband periodic optical pulse train for transmission, via two optical paths;
a pair of NRZ (nonreturn-to-zero) optical modulators positioned in respective optical paths to modulate the single sideband periodic optical pulse train in accordance with NRZ data to produce a pair of RZ (return-to-zero) modulated optical signals;
an optical phase shifter positioned In one of the two optical paths, to adjust the phase of one of the RZ modulated optical signals;
a polarization beam splitter arranged at the end of the two optical paths, to reflect a resultant RZ modulated optical signal; and an optical filter arranged to filter the resultant RZ modulated optical signal to produce a final optical signal having an Increased side suppression ratio.

17. The optical single sideband transmitter as claimed in claim 16, wherein the dual-arm drive Mach-Zehner optical modulator is made of one of lithium niobate, polymer, and semiconductor.

18. The optical single sideband transmitter as claimed in claim 16, further comprising an optical multiplexer arranged to multiplex the resultant optical signal having a predetermined wavelength along with other optical signals having different wavelengths.

* * * * *